United States Patent
Yoon et al.

(10) Patent No.: US 10,122,404 B2
(45) Date of Patent: *Nov. 6, 2018

(54) WIRELESS TRANSCEIVER FOR TRANSMITTING CIRCULARLY-POLARIZED SIGNALS WITH MODULATED ANGULAR SPEED

(71) Applicant: Movandi Corporation, Newport Beach, CA (US)

(72) Inventors: Seunghwan Yoon, Irvine, CA (US); Alfred Grau Besoli, Irvine, CA (US); Ahmadreza Rofougaran, Newport Coast, CA (US); Farid Shirinfar, Granada Hills, CA (US); Maryam Rofougaran, Rancho Palos Verdes, CA (US); Sam Gharavi, Irvine, CA (US); Michael Boers, South Turramurra (AU)

(73) Assignee: Movandi Corporation, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/718,527

(22) Filed: Sep. 28, 2017

(65) Prior Publication Data

US 2018/0109404 A1    Apr. 19, 2018

Related U.S. Application Data

(63) Continuation of application No. 15/292,379, filed on Oct. 13, 2016, now Pat. No. 9,813,269.

(51) Int. Cl.
*H03C 3/00* (2006.01)
*H03K 7/06* (2006.01)
(Continued)

(52) U.S. Cl.
CPC ..................... *H04B 1/40* (2013.01)

(58) Field of Classification Search
CPC ............... H03F 1/3247; H03F 1/3294; H03F 2201/3233; H04L 27/368; H04L 25/03343;
(Continued)

(56) References Cited

U.S. PATENT DOCUMENTS 4,291,277 A * 9/1981 Davis ...................... H03C 3/08
                                                          330/149
4,521,878 A * 6/1985 Toyonaga ................ H04B 7/00
                                                          370/203

(Continued)

*Primary Examiner* — James M Perez
(74) *Attorney, Agent, or Firm* — Farjami & Farjami LLP

(57) ABSTRACT

A radio frequency (RF) front end chip in a phased array antenna panel for transmitting a modulated circularly-polarized signal is disclosed. The RF front end chip includes an oscillator providing an angular speed modulation signal to a quadrature generation block, the quadrature generation block providing an in-phase signal and a quadrature signal based on the angular speed modulation signal, a first amplifier receiving the in-phase signal and a data signal, and providing a modulated horizontally-polarized signal, and a second amplifier receiving the quadrature signal and the data signal, and providing a modulated vertically-polarized signal, where a modulated circularly-polarized signal is generated based on the modulated horizontally-polarized signal and the modulated vertically-polarized signal. The angular speed modulation signal controls an angular speed of the modulated circularly-polarized signal. The data signal is encoded by the angular speed modulation signal.

7 Claims, 5 Drawing Sheets

(51) Int. Cl.
*H04L 27/12* (2006.01)
*H04B 1/40* (2015.01)

(58) Field of Classification Search
CPC . H04L 27/04; H04L 25/497; H04L 25/03057; H03C 1/10; H03C 1/50; H03B 5/10; H03B 11/08; H04B 3/23; H04B 3/32
USPC ............................... 375/259–285, 295–315
See application file for complete search history.

(56) References Cited

U.S. PATENT DOCUMENTS

| | | | | |
|---|---|---|---|---|
| 6,160,855 | A * | 12/2000 | Nakamura | H04L 27/34 329/304 |
| 7,609,608 | B2 * | 10/2009 | Rogerson | H03K 3/0315 370/203 |
| 7,647,028 | B2 * | 1/2010 | Beamish | H01Q 3/267 375/296 |
| 7,865,152 | B2 * | 1/2011 | Brown | F41A 33/02 342/365 |
| 8,081,699 | B2 * | 12/2011 | Siwiak | H01Q 21/24 375/267 |
| 8,340,197 | B2 * | 12/2012 | Uhl | H04L 27/20 343/700 MS |
| 8,351,543 | B2 * | 1/2013 | Kenington | H03F 1/3247 375/259 |
| 8,391,376 | B2 * | 3/2013 | Uhl | H01Q 3/2605 343/700 MS |
| 8,478,344 | B2 * | 7/2013 | Rofougaran | H01L 23/66 307/125 |
| 8,537,657 | B2 * | 9/2013 | Harris | H03D 3/02 370/204 |
| 8,649,418 | B1 * | 2/2014 | Negus | H04B 7/0486 375/211 |
| 8,665,994 | B2 * | 3/2014 | Asplund | H04B 7/0417 375/260 |
| 9,450,449 | B1 * | 9/2016 | Leabman | H04B 5/0037 |
| 9,692,489 | B1 * | 6/2017 | Rofougaran | H04B 7/185 |
| 9,755,601 | B1 * | 9/2017 | Gharavi | H04B 1/16 |
| 9,813,231 | B1 * | 11/2017 | Gharavi | H01Q 21/22 |
| 9,813,269 | B1 * | 11/2017 | Yoon | H04B 1/40 |
| 9,887,760 | B1 * | 2/2018 | Sridharan | H04B 17/318 |
| 9,923,712 | B2 * | 3/2018 | Shirinfar | H04B 17/12 |
| 9,935,663 | B1 * | 4/2018 | Rofougaran | H04B 1/0483 |
| 9,948,260 | B1 * | 4/2018 | Gharavi | H04B 1/16 |
| 10,014,567 | B2 * | 7/2018 | Rofougaran | H01Q 1/2283 |
| 10,014,887 | B1 * | 7/2018 | Gharavi | H04B 1/04 |
| 10,062,965 | B2 * | 8/2018 | De Flaviis | H01Q 3/2658 |
| 2004/0264592 | A1 * | 12/2004 | Sibecas | H01Q 21/24 375/267 |
| 2006/0276146 | A1 * | 12/2006 | Suzuki | H03F 1/3252 455/114.3 |
| 2008/0013445 | A1 * | 1/2008 | Siwiak | H01Q 21/24 370/206 |
| 2008/0013646 | A1 * | 1/2008 | Hamada | H04B 1/0475 375/297 |
| 2009/0180466 | A1 * | 7/2009 | Soul | H03J 7/04 370/350 |
| 2010/0208844 | A1 * | 8/2010 | Uhl | H04B 7/10 375/308 |
| 2010/0216412 | A1 * | 8/2010 | Rofougaran | H04B 1/0003 455/78 |
| 2010/0297962 | A1 * | 11/2010 | Rofougaran | H04B 1/18 455/88 |
| 2011/0150130 | A1 * | 6/2011 | Kenington | H03F 1/3247 375/296 |
| 2013/0012144 | A1 * | 1/2013 | Besoli | H01Q 1/36 455/85 |
| 2013/0022152 | A1 * | 1/2013 | McGowan | H01Q 1/246 375/299 |
| 2013/0023210 | A1 * | 1/2013 | Rofougaran | H01L 23/66 455/41.1 |
| 2013/0072125 | A1 * | 3/2013 | Yoon | H01P 1/10 455/67.11 |
| 2014/0146902 | A1 * | 5/2014 | Liu | H04B 7/0689 375/260 |
| 2015/0108210 | A1 * | 4/2015 | Zhou | H03H 7/18 235/375 |
| 2015/0171937 | A1 * | 6/2015 | Murakami | H04B 7/04 375/267 |
| 2015/0241552 | A1 * | 8/2015 | Mohamadi | G01S 7/02 342/175 |
| 2016/0099613 | A1 * | 4/2016 | Bell | H02J 7/025 307/104 |
| 2018/0040946 | A1 * | 2/2018 | Boers | H01Q 1/2275 |
| 2018/0069292 | A1 * | 3/2018 | Rofougaran | H01Q 1/2283 |
| 2018/0069296 | A1 * | 3/2018 | Rofougaran | H01Q 21/24 |
| 2018/0069605 | A1 * | 3/2018 | Gharavi | H04B 7/04 |
| 2018/0090813 | A1 * | 3/2018 | Yoon | H01Q 3/26 |
| 2018/0090814 | A1 * | 3/2018 | Yoon | H01Q 1/526 |
| 2018/0109404 | A1 * | 4/2018 | Yoon | H04B 1/40 |
| 2018/0115083 | A1 * | 4/2018 | Besoli | H01Q 3/2658 |
| 2018/0234119 | A1 * | 8/2018 | Gharavi | H04B 1/04 |
| 2018/0234120 | A1 * | 8/2018 | Gharavi | H04B 1/04 |

* cited by examiner

WIRELESS TRANSCEIVER FOR TRANSMITTING CIRCULARLY-POLARIZED SIGNALS WITH MODULATED ANGULAR SPEED

The present application is a continuation application of U.S. patent application Ser. No. 15/292,379, titled "Wireless Transceiver Having a Phased Array Antenna Panel for Transmitting Circularly-Polarized Signals with Modulated Angular Speed," filed on Oct. 13, 2016. The above-identified application is hereby incorporated fully by reference into the present application.

BACKGROUND

Wireless communications systems, such as satellite communications systems, can transmit data using circularly polarized signals. In a conventional wireless transmitter, a horizontally-polarized signal and a vertically polarized signal may be combined to form a circularly-polarized signal before being transmitted by the wireless transmitter. In the conventional wireless transmitter, a horizontally-polarized signal and a vertically-polarized signal are provided directly from a processing unit to a radio frequency (RF) front end chip where the amplitude and phase of the horizontally-polarized signal and the vertically polarized signal may be adjusted before being converted to the circularly-polarized signal for transmission. Thus, the circularly-polarized signal formed in the conventional wireless transmitter has a fixed angular speed. However, modulating the angular speed of a circularly-polarized signal may add additional information to the signal to be transmitted by the wireless transceiver.

Thus, there is a need in the art for a wireless transceiver that can transmit circularly-polarized signals with modulated angular speed.

SUMMARY

The present disclosure is directed to a wireless transceiver having a phased array antenna panel for transmitting circularly-polarized signals with modulated angular speed, substantially as shown in and/or described in connection with at least one of the figures, and as set forth in the claims.

DETAILED DESCRIPTION

Figure 1A:
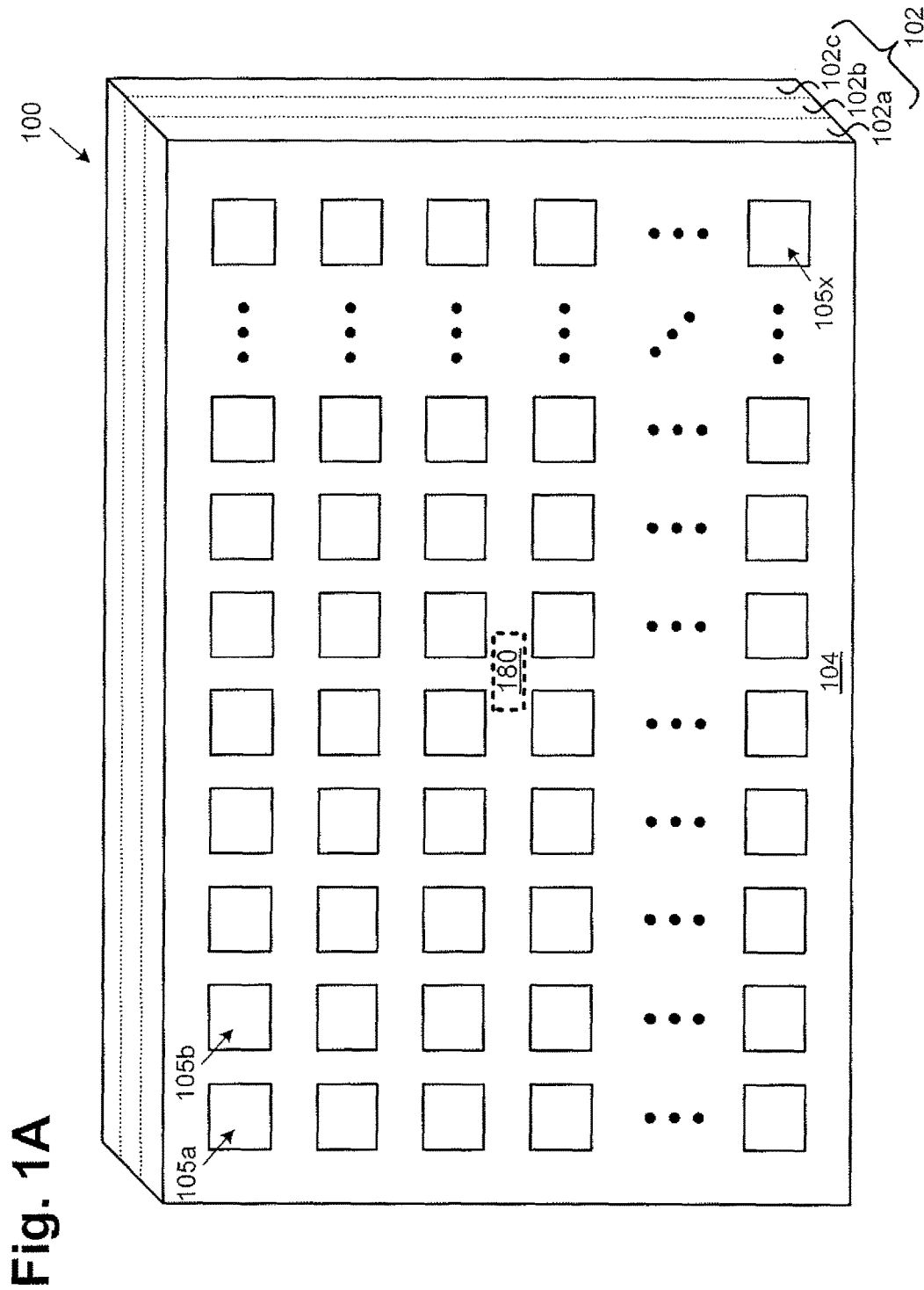
FIG. 1A illustrates a perspective view of a portion of an exemplary wireless transceiver using a phased array antenna panel for transmitting and/or receiving wireless signals according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A illustrates a perspective view of a portion of an exemplary wireless transceiver using a phased array antenna panel for transmitting and/or receiving wireless signals according to one implementation of the present application. As illustrated in FIG. 1A, wireless transceiver 100 includes substrate 102 having layers 102a, 102b and 102c, phased array antenna panel 104 having a plurality of front end units such as front end units 105a, 105b and 105x (hereinafter collectively referred to as "front end units 105"), and master chip 180.

In the present implementation, substrate 102 may be a multi-layer printed circuit board (PCB) having layers 102a, 102b and 102c and additional layers below layer 102c that are not explicitly shown. Although only three layers are shown in FIG. 1A, in another implementation, substrate 102 may be a multi-layer PCB having more or less than three layers. Phased array antenna panel 104 having front end units 105 is formed in layer 102a of substrate 102. In one implementation, substrate 102 of wireless transceiver 100 may include 500 front end units 105, each having a radio frequency (RF) front end chip coupled to a plurality of antennas (not explicitly shown in FIG. 1A). In one implementation, wireless transceiver 100 may include 2000 antennas on phased array antenna panel 104, where each front end unit 105 includes four antennas coupled to an RF front end chip (not explicitly shown in FIG. 1A).

In the present implementation, master chip 180 may be formed in layer 102c of substrate 102 (which is just below routing layer 102b and antenna panel layer 102a). Master chip 180 may be coupled to front end units 105 in layer 102a using a plurality of buses (not explicitly shown in FIG. 1A) routed through layers 102a and 102b of substrate 102, for example. In the present implementation, master chip 180 is configured to provide phase and amplitude control information as well as encoded data information from a digital core in master chip 180 to the RF front end chips in each of front end units 105. For example, master chip 180 may drive in parallel a number of N-bit buses where each N-bit bus is coupled to a respective segment of the front end units.

Figure 1B:
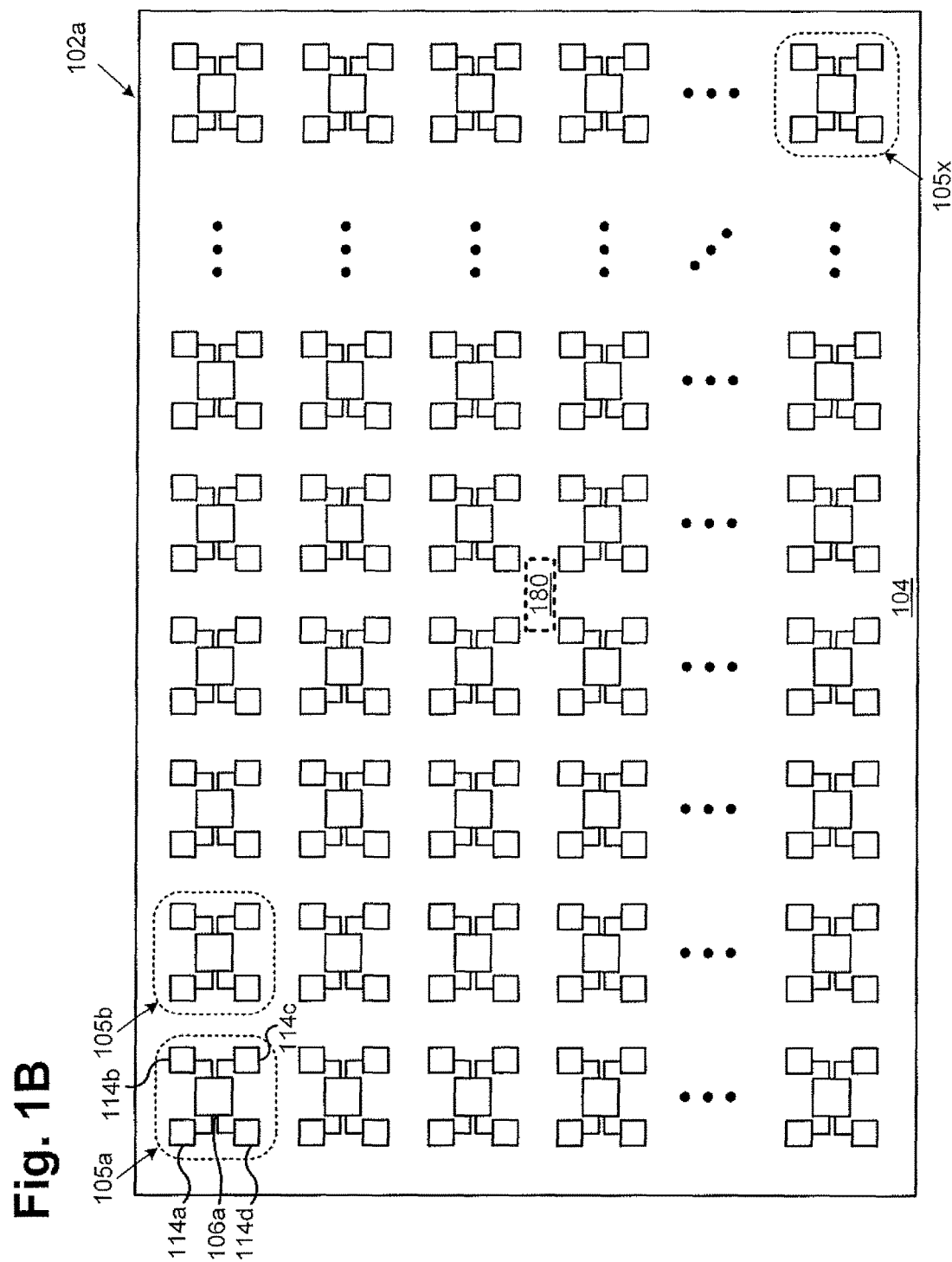
FIG. 1B illustrates a top plan view of a portion of an exemplary wireless transceiver using a phased array antenna panel for transmitting and/or receiving wireless signals according to one implementation of the present application.

FIG. 1B illustrates a top plan view of a portion of an exemplary wireless transceiver using a phased array antenna panel for transmitting and/or receiving wireless signals according to one implementation of the present application. As illustrated in FIG. 1B, phased array antenna panel 104 is formed in layer 102a of a multi-layer substrate, such as substrate 102 in FIG. 1A. Phased array antenna panel 104 includes a plurality of front end units, such as front end units 105a, 105b and 105x (hereinafter collectively referred to as "front end units 105"). In one implementation, layer 102a, phased array antenna panel 104, front end units 105, and master chip 180 in FIG. 1B may substantially correspond to layer 102a, phased array antenna panel 104, front end units 105, and master chip 180, respectively, of wireless transceiver 100 in FIG. 1A.

As illustrated in FIG. 1B, each of front end units 105 includes an RF front end chip coupled to a group of four antennas. For example, in front end unit 105a, RF front end chip 106a is surrounded by a group of four antennas, namely, antennas 114a, 114b, 114c and 114d. In one implementation, RF front end unit 105a having RF front end chip 106a and antennas 114a, 114b, 114c and 114d in FIG. 1B may substantially correspond to RF front end unit 105a in FIG. 1A. Antennas 114a, 114b, 114c and 114d are coupled to RF front end chip 106a through antenna feed lines. As can be seen in FIG. 1B, each of front end units 105 of phased array antenna panel 104, such as front end units 105b and 105x, includes an RF front end chip coupled to a group of four antennas.

As illustrated in FIG. 1B, master chip 180 may be formed in a layer of a substrate that is different than layer 102a. In one implementation, master chip 180 in FIG. 1B may substantially correspond to master chip 180 in FIG. 1A, which is formed in layer 102c of substrate 102, and coupled to front end units 105 in layer 102a using a plurality of buses (not explicitly shown in FIG. 1B) routed through layers 102a and 102b of substrate 102, for example. In the present implementation, master chip 180 is configured to provide phase and amplitude control information as well as encoded data information from a digital core in master chip 180 to the RF front end chips in each of front end units 105. For example, master chip 180 may drive in parallel a number of N-bit buses where each N-bit bus is coupled to a respective segment of the front end units.

Figure 2:
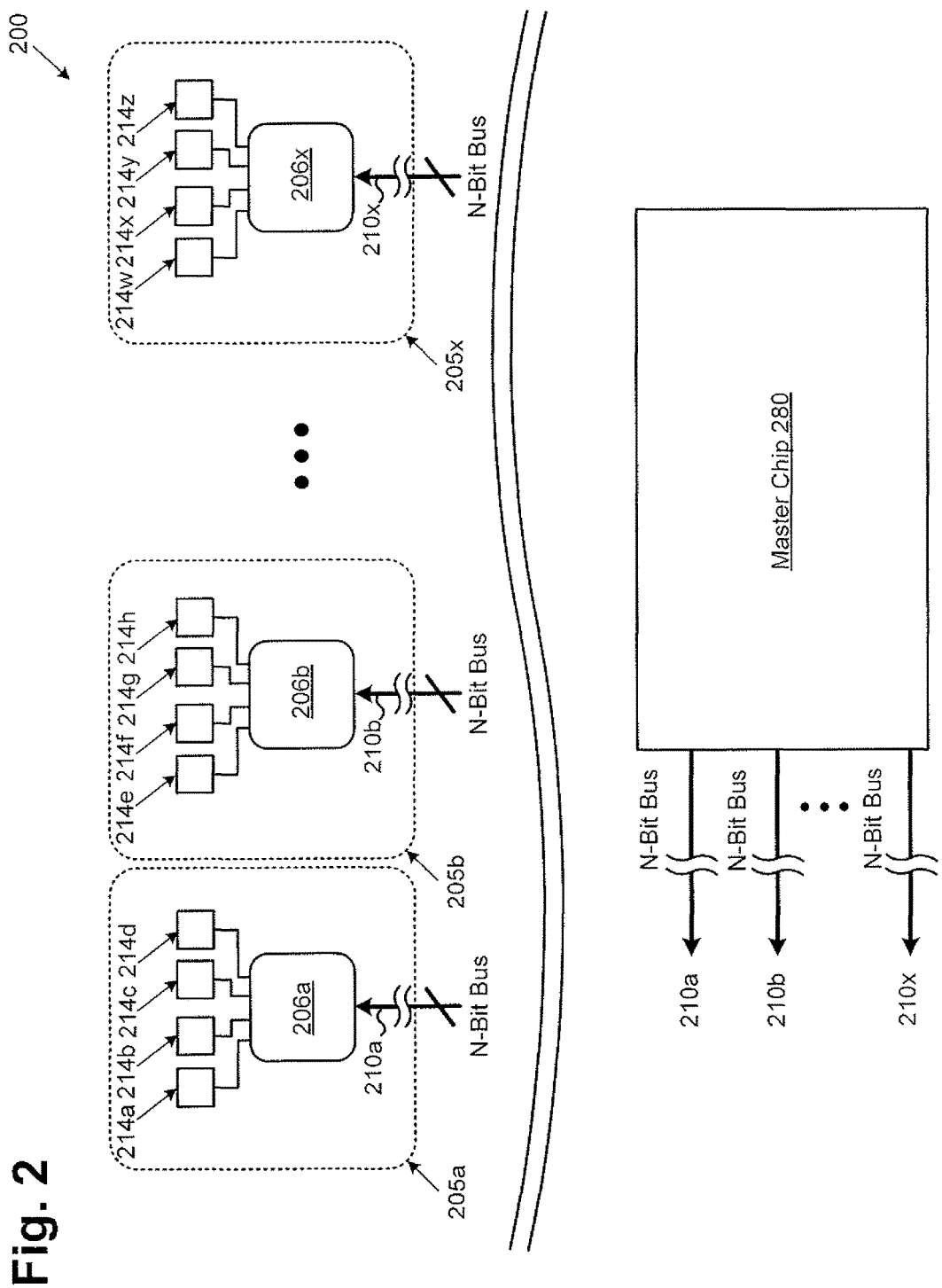
FIG. 2 illustrates a functional block diagram of a portion of an exemplary wireless transceiver according to one implementation of the present application.

FIG. 2 illustrates a functional block diagram of a portion of an exemplary wireless transceiver according to one implementation of the present application. As illustrated in FIG. 2, wireless transceiver 200 includes front end units 205a, 205b through 205x, (hereinafter collectively referred to as front end units 205) and master chip 280. Each of front end units 205 may include an RF front end chip coupled to a plurality of antennas.

As illustrated in FIG. 2, RF front end chip 206a in front end unit 205a is coupled to master chip 280 through N-bit bus 210a for receiving phase and amplitude control information as well as encoded data information. RF front end chip 206a is electrically coupled to antennas 214a, 214b, 214c and 214d in front end unit 205a, where RF front end chip 206a provides a modulated horizontally-polarized signal and a modulated vertically-polarized signal to each of antennas 214a, 214b, 214c and 214d, for example. Similarly, RF front end chip 206b in front end unit 205b is coupled to master chip 280 through N-bit bus 210b for receiving phase and amplitude control information as well as encoded data information. RF front end chip 206b is electrically coupled to antennas 214e, 214f, 214g and 214h in front end unit 205b, where RF front end chip 206b provides a modulated horizontally-polarized signal and a modulated vertically-polarized signal to each of antennas 214e, 214f, 214g and 214h, for example. In addition, RF front end chip 206x in front end unit 205x is coupled to master chip 280 through N-bit bus 210x for receiving phase and amplitude control information as well as encoded data information. RF front end chip 206x is electrically coupled to antennas 214w, 214x, 214y and 214z in front end unit 205x, where RF front end chip 206x provides a modulated horizontally-polarized signal and a modulated vertically-polarized signal to each of antennas 214w, 214x, 214y and 214z, for example.

Figure 3:
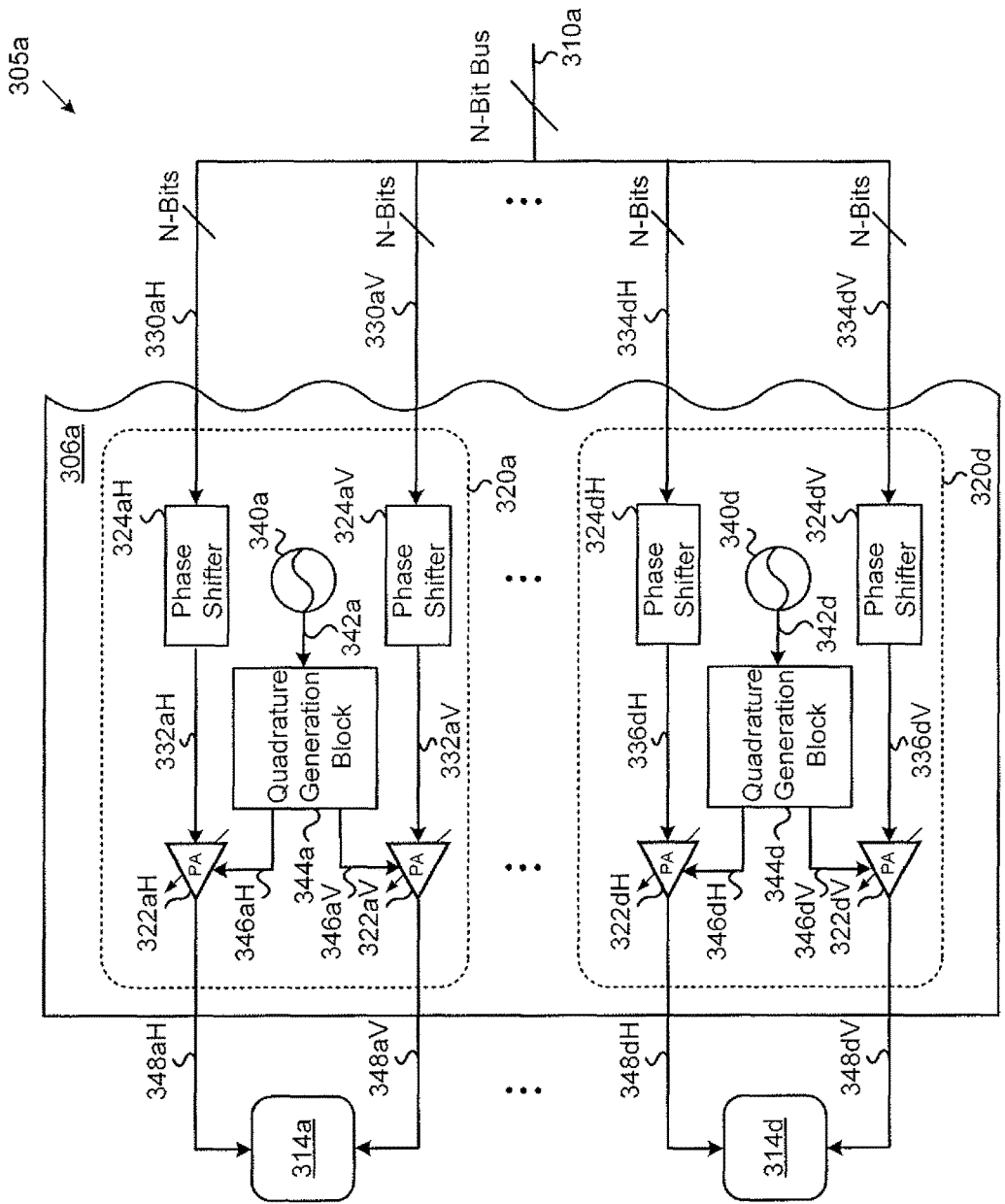
FIG. 3 illustrates a functional circuit diagram of a portion of an exemplary wireless transceiver according to one implementation of the present application.

FIG. 3 illustrates a functional circuit diagram of a portion of an exemplary wireless transceiver according to one implementation of the present application. As shown in FIG. 3, front end unit 305a includes a plurality of antennas, such as antennas 314a and 314d, coupled to RF front end chip 306a. In one implementation, front end unit 305a may substantially correspond to front end unit 105a in FIG. 1B. In one implementation, front end unit 305a may substantially correspond to front end unit 205a in FIG. 2. It is noted that, in FIG. 3, some antennas, which would otherwise correspond to antennas 214b and 214c in FIG. 2 for example, are omitted for conceptual clarity.

As shown in FIG. 3, front end unit 305a receives data signals, having phase and amplitude control information as well as encoded data information, from N-bit bus 310a from a master chip, such as master chip 280 in FIG. 2. The data signals are provided to one or more transmit circuits in RF front end chip 306a, which provides a modulated horizontally-polarized signal and a modulated vertically-polarized signal to each of the antennas coupled thereto. The antennas, such as antennas 314a and 314d may be configured to transmit signals to one or more wireless receivers, such as commercial geostationary communication satellites or low earth orbit satellites having a very large bandwidth in the 10 GHz to 20 GHz frequency range and a very high data rate. In another implementation, antennas 314a and 314d may be configured to transmit signals in the 60 GHz frequency range, sometimes referred to as "60 GHz communications," which involve transmission and reception of millimeter wave signals. Among the applications for 60 GHz communications are wireless personal area networks, wireless high-definition television signal and Point-to-Point links. Also, RF front end chip 306a may also include receive circuits for receiving signals from one or more antennas. The receive circuits are omitted from RF front end chip 306a for conceptual clarity.

As illustrated in FIG. 3, N-bit bus 310a carrying data signals having phase information, amplitude information and encoded data information from a master chip, is provided to transmit circuit 320a in RF front end chip 306a. Transmit circuit 320a includes phase shifters 324aH and 324aV, amplifiers 322aH and 322aV, oscillator 340a and quadrature generation block 344a. For example, data signal 330aH having phase information, amplitude information and encoded data information is provided to phase shifter 324aH, where data signal 330aH may be phase shifted by phase shifter 324aH to form phase shifted data signal 332aH. Phase shifted data signal 332aH from phase shifter 324aH is provided to amplifier 322aH. In addition, oscillator 340a provides angular speed modulation signal 342a to quadrature generation block 344a, which provides in-phase signal 346aH and quadrature signal 346aV based on angular speed modulation signal 342a to amplifiers 322aH and 322aV, respectively. Amplifier 322aH combines phase shifted data signal 332aH from phase shifter 324aH and in-phase signal 346aH from quadrature generation block 344a, and provides modulated horizontally-polarized signal 348aH to antenna 314a. In addition, data signal 330aV having phase information, amplitude information and encoded data information is provided to phase shifter 324aV, where data signal 330aV may be phase shifted by phase shifter 324aV to form phase shifted data signal 332aV. Phase shifted data signal 332aV from phase shifter 324aV is provided to amplifier 322aV. Amplifier 322aV combines phase shifted data signal 332aV from phase shifter 324aV and quadrature signal 346aV from quadrature generation block 344a, and provides modulated vertically-polarized signal 348aV to antenna 314a. In one implementation, antenna 314a may combine modulated horizontally-polarized signal 348aH and modulated vertically-polarized signal 348aV, and generate a modulated circularly-polarized signal for transmission, where angular speed modulation signal 342a controls an angular speed of the modulated circularly-polarized signal. In one implementation, data signals 330aH and 330aV may carry the same data from the master chip;

while in another implementation data carried by data signal 330aH can be different from data carried by data signals 330aV.

As further illustrated in FIG. 3, N-bit bus 310a carrying data signals, having phase information, amplitude information and data information from the master chip, is provided to transmit circuit 320d in RF front end chip 306a. Transmit circuit 320d includes phase shifters 324dH and 324dV, amplifiers 322dH and 322dV, oscillator 340d and quadrature generation block 344d. For example, data signal 334dH having phase information, amplitude information and encoded data information is provided to phase shifter 324dH, where data signal 334dH may be phase shifted by phase shifter 324dH to form phase shifted data signal 336dH. Phase shifted data signal 336dH from phase shifter 324dH is provided to amplifier 322dH. In addition, oscillator 340d provides angular speed modulation signal 342d to quadrature generation block 344d, which provides in-phase signal 346dH and quadrature signal 346dV based on angular speed modulation signal 342d to amplifiers 322dH and 322dV, respectively. Amplifier 322dH combines phase shifted data signal 336dH from phase shifter 324dH and in-phase signal 346dH from quadrature generation block 344d, and provides modulated horizontally-polarized signal 348dH to antenna 314d. In addition, data signal 334dV having phase information, amplitude information and encoded data information is provided to phase shifter 324dV, where data signal 334dV may be phase shifted by phase shifter 324dV to form phase shifted data signal 336dV. Phase shifted data signal 336dV from phase shifter 324dV is provided to amplifier 322dV. Amplifier 322dV combines phase shifted data signal 336dV from phase shifter 324dV and quadrature signal 346dV from quadrature generation block 344d, and provides modulated vertically-polarized signal 348dV to antenna 314d. In one implementation, antenna 314d may combine modulated horizontally-polarized signal 348dH and modulated vertically-polarized signal 348dV, and generate a modulated circularly-polarized signal for transmission, where angular speed modulation signal 342d controls an angular speed of the modulated circularly-polarized signal. In one implementation, data signals 334dH and 334dV may carry the same data from the master chip; while in another implementation data carried by data signal 334dH can be different from data carried by data signals 334dV.

In one implementation, oscillator 340a may be a voltage controlled oscillator. In one implementation, amplifiers 322aH, 322aV, 322dH and 322dV may each be a power amplifier. In another implementation, amplifiers 322aH, 322aV, 322dH and 322dV may each be a variable gain amplifier. In one implementation, oscillator 340a in transmit circuit 320a and oscillator 340d in transmit circuit 320d may respectively provide angular speed modulation signals 342a and 342d, which may have different angular speed modulation frequencies, such that the respective modulated circularly-polarized signals transmitted by antennas 314a and 314d may have different angular speeds. In another implementation, oscillator 340a in transmit circuit 320a and oscillator 340d in transmit circuit 320d may respectively provide angular speed modulation signals 342a and 342d, which may have the same angular speed modulation frequency. It should be noted that although only transmit circuits such as transmit circuits 320a and 320d are shown in RF front end chip 306a, RF front end chip 306a may also include receive circuits (not explicitly shown in FIG. 3) for receiving signals from one or more antennas and providing the received signals to the master chip.

Figure 4:
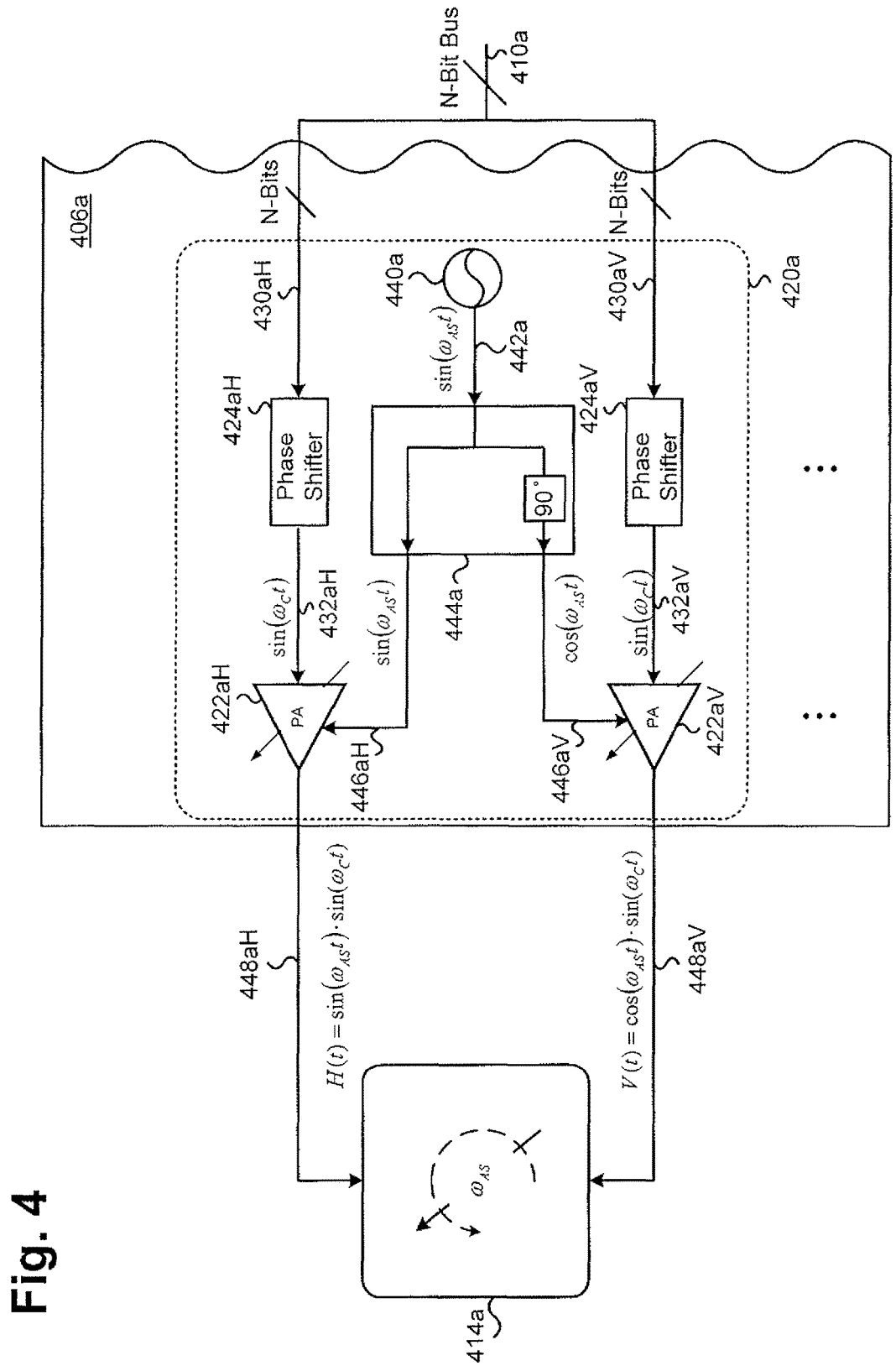
FIG. 4 illustrates a functional circuit diagram of a portion of an exemplary wireless transceiver according to one implementation of the present application.

FIG. 4 illustrates a functional circuit diagram of a portion of an exemplary wireless transceiver according to one implementation of the present application. As shown in FIG. 4, RF front end chip 406a includes transmit circuit 420a coupled to antenna 414a. In one implementation, RF front end chip 406a may substantially correspond to RF front end chip 106a in FIG. 1B. In one implementation, RF front end chip 406a may substantially correspond to RF front end chip 206a in FIG. 2. In one implementation, RF front end chip 406a may substantially correspond to RF front end chip 306a in FIG. 3. It is noted that, in FIG. 4, some antennas and their corresponding transmit circuits are omitted from RF front end chip 406a for conceptual clarity. Also, RF front end chip 406a may also include receive circuits for receiving signals from one or more antennas. The receive circuits are omitted from RF front end chip 406a for conceptual clarity.

As shown in FIG. 4, RF front end chip 406a receives data signals from N-bit bus 410a from a master chip, such as master chip 180 in FIG. 1B or master chip 280 in FIG. 2. N-bit bus 410a carrying data signals having phase information, amplitude information and encoded data information, for example, from the master chip is provided to transmit circuit 420a. Transmit circuit 420a includes phase shifters 424aH and 424aV, amplifiers 422aH and 422aV, oscillator 440a and quadrature generation block 444a.

As shown in FIG. 4, data signal 430aH is provided to phase shifter 424aH, where data signal 430aH may be phase shifted by phase shifter 424aH to generate phase shifted data signal 432aH. In the present implementation, phase shifted data signal 432aH carries the term, $\sin(\omega_C t)$, where $\omega_C$ is the carrier frequency of a modulated circularly-polarized signal to be transmitted by antenna 414a. Phase shifted data signal 432aH from phase shifter 424aH is provided to amplifier 422aH. In addition, oscillator 440a provides angular speed modulation signal 442a to quadrature generation block 444a. In the present implementation, angular speed modulation signal 442a carries the term, $\sin(\omega_{AS} t)$, where $\omega_{AS}$ is the angular speed modulation frequency that controls the angular speed of the modulated circularly-polarized signal to be transmitted by antenna 414a. As illustrated in FIG. 4, quadrature generation block 444a generates in-phase signal 446aH and quadrature signal 446aV based on angular speed modulation signal 442a, where in-phase signal 446aH includes the term, $\sin(\omega_{AS} t)$, while quadrature signal 446aV includes the term, $\cos(\omega_{AS} t)$, which in-phase signal 446aH and quadrature signal 446aV are 90-degree out of phase with each other.

As illustrated in FIG. 4, amplifier 422aH combines phase shifted data signal 432aH having the term, $\sin(\omega_C t)$, from phase shifter 424aH and in-phase signal 446aH having the term, $\sin(\omega_{AS} t)$, from quadrature generation block 444a, and provides modulated horizontally-polarized signal 448aH to antenna 414a. In one implementation, modulated horizontally-polarized signal 448aH may include the term, $\sin(\omega_{AS} t) \cdot \sin(\omega_C t)$.

In addition, data signal 430aV having phase information, amplitude information and encoded data information is provided to phase shifter 424aV, where data signal 430aV may be phase shifted by phase shifter 424aV to form phase shifted data signal 432aV. In the present implementation, phase shifted data signal 432aV also carries the term, $\sin(\omega_C t)$, where $\omega_C$ is the carrier frequency of the modulated circularly-polarized signal to be transmitted by antenna 414a. Phase shifted data signal 432aV from phase shifter 424aV is provided to amplifier 422aV.

It should be noted that, in contrast to a conventional transmit circuit where a horizontal-polarization path and a vertical-polarization path receive an in-phase signal and a quadrature signal, respectively, from a processing unit, in transmit circuit 420a, N-bit bus 410a provides a signal, for example, having the term, $\sin(\omega_C t)$ to both the horizontal-polarization path and the vertical-polarization path. Thus, phase shifted data signal 432aH in the horizontal-polarization path and phase shifted data signal 432aV in the vertical-polarization path both carry the term, $\sin(\omega_C t)$, which is provided from the master chip, for example.

As illustrated in FIG. 4, quadrature generation block 444a generates in-phase signal 446aH and quadrature signal 446aV based on angular speed modulation signal 442a, and provides quadrature signal 446aV having the term, $\cos(\omega_{AS} t)$, to amplifier 422aV. Amplifier 422aV combines phase shifted data signal 432aV having the term, $\sin(\omega_C t)$, from phase shifter 424aV and quadrature signal 446aV having the term, $\cos(\omega_{AS} t)$, from quadrature generation block 444a, and provides modulated vertically-polarized signal 448aV to antenna 414a. In one implementation, modulated vertically-polarized signal 448aV may include the term, $\cos(\omega_{AS} t) \cdot \sin(\omega_C t)$. In one implementation, amplifiers 422aH and 422aV may each be a power amplifier. In another implementation, amplifiers 422aH and 422aV may each be a variable gain amplifier.

In one implementation, modulated horizontally-polarized signal 448aH and modulated vertically-polarized signal 448aV are combined to form a modulated circularly-polarized signal, which may be transmitted by antenna 414a. In one implementation, modulated horizontally-polarized signal 448aH and modulated vertically-polarized signal 448aV may be combined in antenna 414a. In another implementation, modulated horizontally-polarized signal 448aH and modulated vertically-polarized signal 448aV may be combined in RF front end chip 406a before being sent to antenna 414a. In one implementation, the modulated circularly-polarized signal may be a right-handed modulated circularly-polarized signal or a left-handed modulated circularly-polarized signal. In one implementation, data signals 430aH and 430aV may carry the same data from the master chip; while in another implementation data carried by data signal 430aH can be different from data carried by data signals 430aV.

In the present implementation, angular speed modulation signal 442a generated by oscillator 440a controls the angular speed of the modulated circularly-polarized signal. In one implementation, oscillator 440a is a voltage controlled oscillator. In one implementation, oscillator 440a is configured to vary the angular speed of the modulated circularly-polarized signal to be transmitted by antenna 414a. By controlling the angular speed using oscillator 440a and quadrature generation block 444a, transmit circuit 420a can encode data signal 430aH and/or 430aV with angular speed modulation signal 442a, which may provide additional information, such as security information or encryption information in the modulated circularly-polarized signal. As such, only a wireless receiver with knowledge of the modulated circularly-polarized signal with modulated angular speed may receive and decode information from the modulated circularly-polarized signal.

From the above description, it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A wireless transmitter using a phased array antenna panel for transmitting wireless signals comprising:
  a radio frequency (RF) front end chip coupled to an antenna in said phased array antenna panel;
  said RF front end chip comprising an oscillator providing an angular speed modulation signal to a quadrature generation block;
  said RF front end chip receiving a data signal from a master chip, and being configured to combine said data signal with said angular speed modulation signal to provide a modulated polarized signal for transmission by said antenna in said phased array antenna panel.

2. The wireless transmitter of claim 1 wherein said quadrature generation block provides an in-phase signal and a quadrature signal based on said angular speed modulation signal.

3. The wireless transmitter of claim 1 wherein said data signal is encoded by said angular speed modulation signal.

4. The wireless transmitter of claim 1 wherein said angular speed modulation signal controls an angular speed of said modulated polarized signal.

5. The wireless transmitter of claim 1 wherein said oscillator is a voltage controlled oscillator.

6. The wireless transmitter of claim 1 wherein said modulated polarized signal is a right-handed modulated circularly-polarized signal or a left-handed modulated circularly-polarized signal.

7. The wireless transmitter of claim 1 wherein said master chip is integrated in said phased array antenna panel.

* * * * *